United States Patent
Otonari

(10) Patent No.: US 8,942,699 B2
(45) Date of Patent: Jan. 27, 2015

(54) BASE STATION, MOBILE STATION, COMMUNICATION SYSTEM, AND COMMUNICATION METHOD

(75) Inventor: Junji Otonari, Kawasaki (JP)

(73) Assignee: Fujitsu Limited, Kawaski (JP)

( * ) Notice: Subject to any disclaimer, the term of this patent is extended or adjusted under 35 U.S.C. 154(b) by 446 days.

(21) Appl. No.: 12/855,221

(22) Filed: Aug. 12, 2010

(65) Prior Publication Data

US 2011/0053585 A1 Mar. 3, 2011

(30) Foreign Application Priority Data

Sep. 1, 2009 (JP) .................................. 2009-201519

(51) Int. Cl.
H04W 36/00 (2009.01)
H04W 72/08 (2009.01)
H04W 72/04 (2009.01)

(52) U.S. Cl.
CPC ........ H04W 72/085 (2013.01); *H04W 72/0426* (2013.01)
USPC ........... 455/436; 455/438; 455/445; 455/126; 455/69; 370/331; 370/332

(58) Field of Classification Search
CPC .............. H04W 72/04; H04W 72/085; H04W 72/0426
USPC ................ 455/436, 422.1, 437, 438, 69, 126; 370/331, 332
See application file for complete search history.

(56) References Cited

U.S. PATENT DOCUMENTS

| | | | |
|---|---|---|---|
| 5,309,503 A | 5/1994 | Bruckert et al. | |
| 6,396,820 B1 * | 5/2002 | Dolan et al. | 370/328 |
| 6,993,341 B2 | 1/2006 | Hunzinger | |
| 7,142,861 B2 * | 11/2006 | Murai | 455/444 |
| 7,864,682 B2 * | 1/2011 | Appaji et al. | 370/235 |
| 7,899,028 B2 * | 3/2011 | Semper | 370/350 |
| 8,233,926 B2 * | 7/2012 | Heath et al. | 455/501 |
| 2001/0012279 A1 | 8/2001 | Haumont et al. | |
| 2003/0054812 A1 * | 3/2003 | Hunzinger | 455/423 |
| 2003/0165126 A1 * | 9/2003 | Sugita | 370/332 |
| 2004/0142699 A1 * | 7/2004 | Jollota et al. | 455/452.2 |

(Continued)

FOREIGN PATENT DOCUMENTS

| | | |
|---|---|---|
| CN | 101160745 | 4/2008 |
| JP | 2003-179958 | 6/2003 |

(Continued)

OTHER PUBLICATIONS

European Search Report with Annex and Search Opinion issued for corresponding European Patent Application No. 10174234, mailed Nov. 26, 2010.

(Continued)

*Primary Examiner* — Allahyar Kasraian
(74) *Attorney, Agent, or Firm* — Myers Wolin, LLC

(57) ABSTRACT

A base station communicates with a mobile station that receives downlink data from the base station and that transmits uplink data to a second base station. The base station includes a data transmitter configured to transmit the downlink data to the mobile station; and a control information receiver configured to receive from the mobile station through a path passing through the second base station, feedback information concerning the downlink data transmitted by the data transmitter.

15 Claims, 12 Drawing Sheets

(56) References Cited

U.S. PATENT DOCUMENTS

| | | | |
|---|---|---|---|
| 2004/0147263 A1* | 7/2004 | Schwarz et al. | 455/436 |
| 2005/0130662 A1 | 6/2005 | Murai | |
| 2005/0201332 A1* | 9/2005 | Bakshi et al. | 370/333 |
| 2006/0009230 A1 | 1/2006 | Fukumoto et al. | |
| 2006/0286996 A1* | 12/2006 | Julian et al. | 455/522 |
| 2008/0019337 A1 | 1/2008 | Tiirola et al. | |
| 2009/0028091 A1* | 1/2009 | Dimou | 370/328 |
| 2009/0028112 A1* | 1/2009 | Attar et al. | 370/332 |
| 2009/0296663 A1* | 12/2009 | Wild | 370/335 |
| 2011/0249619 A1* | 10/2011 | Yu et al. | 370/328 |
| 2011/0249620 A1* | 10/2011 | Yu et al. | 370/328 |

FOREIGN PATENT DOCUMENTS

| | | |
|---|---|---|
| JP | 2005-354537 | 12/2005 |
| JP | 2007-514367 | 5/2007 |
| WO | 2005/057975 | 6/2005 |
| WO | 2006/089196 | 8/2006 |
| WO | 2008/009781 | 1/2008 |

OTHER PUBLICATIONS

NTT Docomo, Inc., "Inter-cell Radio Resource Management for Heterogeneous Networks", Agenda Item: 15.2, Aug. 24-28, 2009, R1-093505, 3GPP TSG RAN WG1 Metting #58, Shenzhen, China.

Japanese Office Action issued for corresponding Japanese Patent Application No. 2009-201519, mailed Mar. 12, 2013 with partial English translation.

First Notification of Office Action issued for corresponding Chinese Patent Application No. 201010263548.7, issued Feb. 5, 2013, with English translation.

First Office Action issued for corresponding Chinese Patent Application No. 201010263548.7, dated Feb. 5, 2013 with an English translation.

Chinese Office Action corresponding to Chinese Patent Application 201010263548.7, mailed Oct. 25, 2013, with English translation.

European Office Action issued for corresponding European Patent Application No. 10 174 234.4, dated Jun. 27, 2014.

Third Notification of Office Action issued for corresponding Chinese Patent Application No. 201010263548.7, dated Apr. 9, 2014, with an English translation.

* cited by examiner

FIG.11

| TYPE OF INFORMATION | DIRECTION OF TRANSMISSION | PERMISSIBLE DELAY | DATA SIZE | SELECTION RESULT |
|---|---|---|---|---|
| Ack/Nack INFORMATION | UPLINK | SMALL (APPROXIMATELY SEVERAL ms) | SMALL (APPROXIMATELY 1 BIT) | FB_ch1 |
| CQI INFORMATION | UPLINK | LARGE (APPROXIMATELY SEVERAL TENS ms) | INTERMEDIATE (APPROXIMATELY SEVERAL BITS) | FB_ch2 |

1110   1120   1100

BASE STATION, MOBILE STATION, COMMUNICATION SYSTEM, AND COMMUNICATION METHOD

CROSS REFERENCE TO RELATED APPLICATIONS

This application is based upon and claims the benefit of priority of the prior Japanese Patent Application No. 2009-201519, filed on Sep. 1, 2009, the entire contents of which are incorporated herein by reference.

FIELD

The embodiments discussed herein are related to a base station, a mobile station, a communication system, and a communication method.

BACKGROUND

In a radio communication system, when a mobile station selects a base station to connect to through a radio channel, the mobile station measures the transmission power of a signal transmitted from each base station and carries out control to connect to the base station having a relatively higher reception power in an effort to establish the most reliable link. If the base stations have similar signal transmission powers and coverage areas that are of a similar size, the mobile station selects the base station that maximizes the reception power at the mobile station as a counterpart for downlink communication, and selects the base station that maximizes the reception power at the base station as a counterpart for uplink communication.

In recent years, radio communication systems have improved in terms of eliminating dead zones due to limitations of radio characteristics and in terms of expanding service areas. For example, one method adopted for such improvement involves arranging small-scale base stations forming small radio cells, which are referred to as microcells or pico-cells, in the coverage area or area boundary of a base station forming a wide range cell aimed at cellular phone service. A radio communication system in which cells having coverage areas of different sizes are present together may, however, invite a situation in which the optimal radio communication link to a mobile station for uplink communication is different from the optimal radio communication link for downlink communication.

This is because the magnitude of the downlink reception power measured at the mobile station depends on propagation loss in the direction of downlink from each base station while the magnitude of uplink reception power measured at a base station depends on propagation loss in the direction of uplink, i.e., downlink reception power at the mobile station becomes greater through connection to a base station having a large-scale cell that has greater transmission power, while uplink reception power measured at a base station becomes greater at a base station having a small-scale cell that makes the distance between the base station and the mobile station shorter and propagation loss in the direction of uplink smaller.

If the mobile station determines a large-scale cell to be a connection counterpart cell according to the magnitude of reception power for receiving downlink data from the base station, although the reception quality of the radio downlink becomes optimal from the viewpoint of radio characteristics, the reception quality of the uplink becomes inferior. In contrast, if a small-sized cell is determined to be the connection counterpart cell, the reception quality of the downlink deteriorates while the radio characteristics of the uplink improve.

A method has been proposed, by which a base station and a mobile station are provided respectively with a function of independently establishing an uplink and a downlink when the optimal connection counterpart cell for the mobile station in the uplink is different from that in the downlink (see, e.g., Japanese Patent Application Laid-Open Publication No. 2007-514367). This method of connection is referred to as, for example, "uplink/downlink asymmetrical connection" or "uplink/downlink unbalanced connection".

This method of connection uses operations of high speed packet access (HSPA) standardized by the 3rd Generation Partnership Project (3GPP), hybrid-automatic repeat request (HARQ) conforming to Long Term Evolution (LTE), etc.

In these operations, control information, such as Ack/Nack information, channel quality indicator (CQI), and Uplink Grant (UL Grant), is transmitted through a link opposite in direction to a link for data transmission, as feedback information for data transmission.

The conventional technique, however, poses a problem in that the propagation quality of feedback information for data transmission deteriorates. For example, if a mobile station receives downlink data from a first base station having a relatively high downlink propagation quality and transmits uplink data to a second base station having a relatively high uplink propagation quality, uplink feedback information for transmission of the downlink data is transmitted to the first base station having a lower uplink propagation quality than the second base station, while downlink feedback information for transmission of the uplink data is transmitted from the second base station having a lower downlink propagation quality than the first base station. As a result, the propagation quality of feedback information deteriorates.

Possible solutions to this problem include, for example, improving error correction by lowering the encoding rate of the error-correction encoding method for feedback information and increasing the transmission power for transmitting feedback information. These solutions, however, lead to another problem of an increase in communication resources and power consumption for transmission of feedback information.

SUMMARY

According to an aspect of an embodiment, a base station communicates with a mobile station that receives downlink data from the base station and that transmits uplink data to a second base station. The base station includes a data transmitter configured to transmit the downlink data to the mobile station; and a control information receiver configured to receive from the mobile station through a path passing through the second base station, feedback information concerning the downlink data transmitted by the data transmitter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram of an example of selection from among the feedback paths in the example of FIG. 10.

DESCRIPTION OF EMBODIMENTS

Preferred embodiments of the present invention will be explained with reference to the accompanying drawings.

Figure 1:
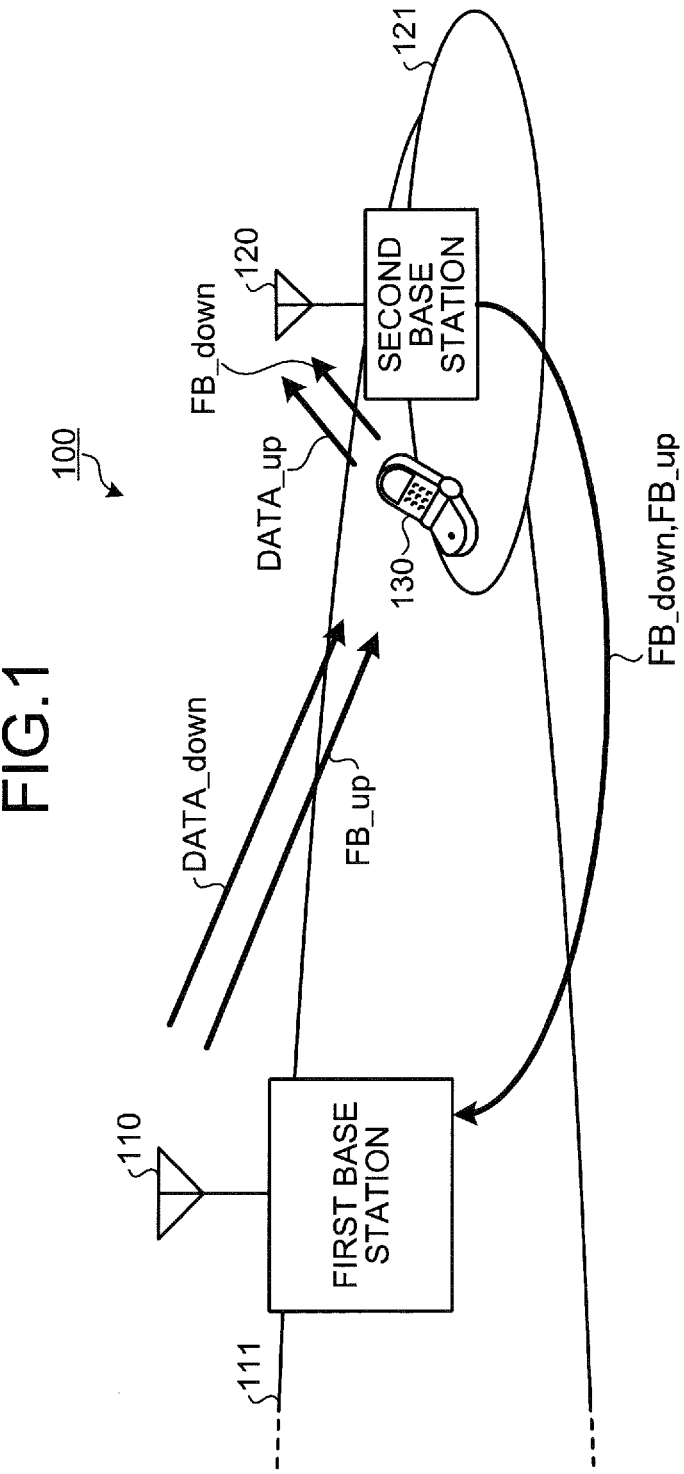
FIG. 1 is a diagram of a configuration of a communication system according to an embodiment.

FIG. 1 is a diagram of a configuration of a communication system according to an embodiment. As depicted in FIG. 1, a communication system 100 according to the embodiment includes a first base station 110, a second base station 120, and a mobile station 130. The first base station 110 carries out radio communication with mobile stations in a cell 111 formed around the first base station 110. The second base station 120 carries out radio communication with mobile stations in a cell 121 formed around the second base station 120. The first base station 110 and the second station 120 are connected to, for example, a core network and relay communication between the mobile stations and the core network.

In FIG. 1, the mobile station 130 is located in an area where the cells 111 and 121 overlap each other, thus is in a state of being able to carry out radio communication with the first base station 110 and the second base station 120. The transmission power of the first base station 110 is greater than that of the second base station 120. For the mobile station 130, therefore, the first base station 110 may have a higher downlink propagation quality (e.g., high reception power and low propagation loss) than the second base station 120, while the second base station 120 may have a higher uplink propagation quality than the first base station 110.

The mobile station 130 measures the propagation quality of a downlink from the first base station 110 and the propagation quality of a downlink from the second base station 120 and selects the base station having the higher measured propagation quality, as the base station from which downlink data is to be received. Measurement of the propagation quality of a downlink from each base station is carried out by, for example, receiving a pilot signal transmitted from each base station.

The mobile station 130 measures the propagation quality of an uplink to the first base station 110 and the propagation quality of an uplink to the second base station 120 and selects the base station having the higher measured propagation quality, as the base station to which uplink data is to be transmitted. Measurement of the propagation quality of an uplink to each base station is carried out by, for example, transmitting a pilot signal to each base station and receiving from each base station, quality information that indicates the propagation quality measured at the base station.

For example, if measurement by the mobile station 130 leads to a conclusion that the first base station 110 has higher downlink and uplink propagation qualities than the second base station 120, the mobile station 130 receives downlink data from and transmits uplink data to the first base station 110 (not depicted).

The mobile station 130 is capable of receiving downlink data from one base station and transmitting uplink data to another base station. Hereinafter, receiving downlink data from one base station and transmitting uplink data to another base station is referred to as uplink/downlink asymmetrical connection. An example is assumed where propagation quality measurements indicate that the first base station 110 has a higher downlink propagation quality than the second base station 120, while the second base station 120 has a higher uplink propagation quality than the first base station 110.

In this example, as depicted in FIG. 1, the mobile station 130 receives downlink data DATA_down from the first base station 110 and transmits uplink data DATA_up to the second base station 120. At this time, the mobile station 130 transmits an asymmetrical connection request for uplink/downlink asymmetrical connection to at least the first base station 110 or the second base station 120.

Hereinafter, an example of uplink/downlink asymmetrical connection will be described primarily, where the mobile station 130 receives the downlink data DATA_down from the first base station 110 and transmits the uplink data DATA_up to the second base station 120.

When the mobile station 130 carries out the uplink/downlink asymmetrical connection, the first base station 110 transmits the downlink data DATA_down to the mobile station 130. The first base station 110 also receives from the mobile station 130, through a path passing through the second base station 120, feedback information FB_down concerning the downlink data DATA_down. A path passing through another base station (e.g., the second base station 120) will hereinafter be referred to as a detour path.

The feedback information FB_down concerning the downlink data DATA_down is control information that is used to transmit the downlink data DATA_down and that is transmitted in a link direction (uplink direction) opposite to the link direction of the downlink data DATA_down. For example, the feedback information FB_down is such control information as delivery acknowledgement information (Ack/Nack) transmitted from the mobile station 130 in response to the downlink data transmitted thereto and CQI for adjusting a downlink data transmitting condition.

When the mobile station 130 carries out the uplink/downlink asymmetrical connection, the second base station 120 receives the uplink data DATA_up transmitted from the mobile station 130. The second base station 120 also transmits to the mobile station 130, through a detour path passing through the first base station 110, feedback information FB_up concerning the uplink data DATA_up.

The feedback information FB_up concerning the uplink data DATA_up is control information that is used to transmit the uplink data DATA_up and that is transmitted in a link direction (downlink direction) opposite to the link direction of the uplink data DATA_up. For example, the feedback information FB_up is such control information as delivery acknowledgement information (Ack/Nack) transmitted from the second base station 120 in response to the uplink data transmitted thereto from the mobile station 130 and UL Grant for adjusting an uplink data receiving condition.

In this manner, the downlink data DATA_down can be transmitted through a path from the first base station 110, which has a high downlink propagation quality to the mobile station 130. The feedback information FB_down concerning the downlink data DATA_down can be transmitted through a path from the mobile station 130, which has a high uplink propagation quality to the second base station 120. This improves the transmission quality of the feedback information FB_down.

Further, the uplink data DATA_up can be transmitted through a path from the mobile station 130, which has a high uplink propagation quality to the second base station 120. The feedback information FB_up concerning the uplink data DATA_up can be transmitted through a path from the first base station 110, which has a high downlink propagation quality to the mobile station 130. This improves the transmission quality of the feedback information FB_up.

Figure 2:
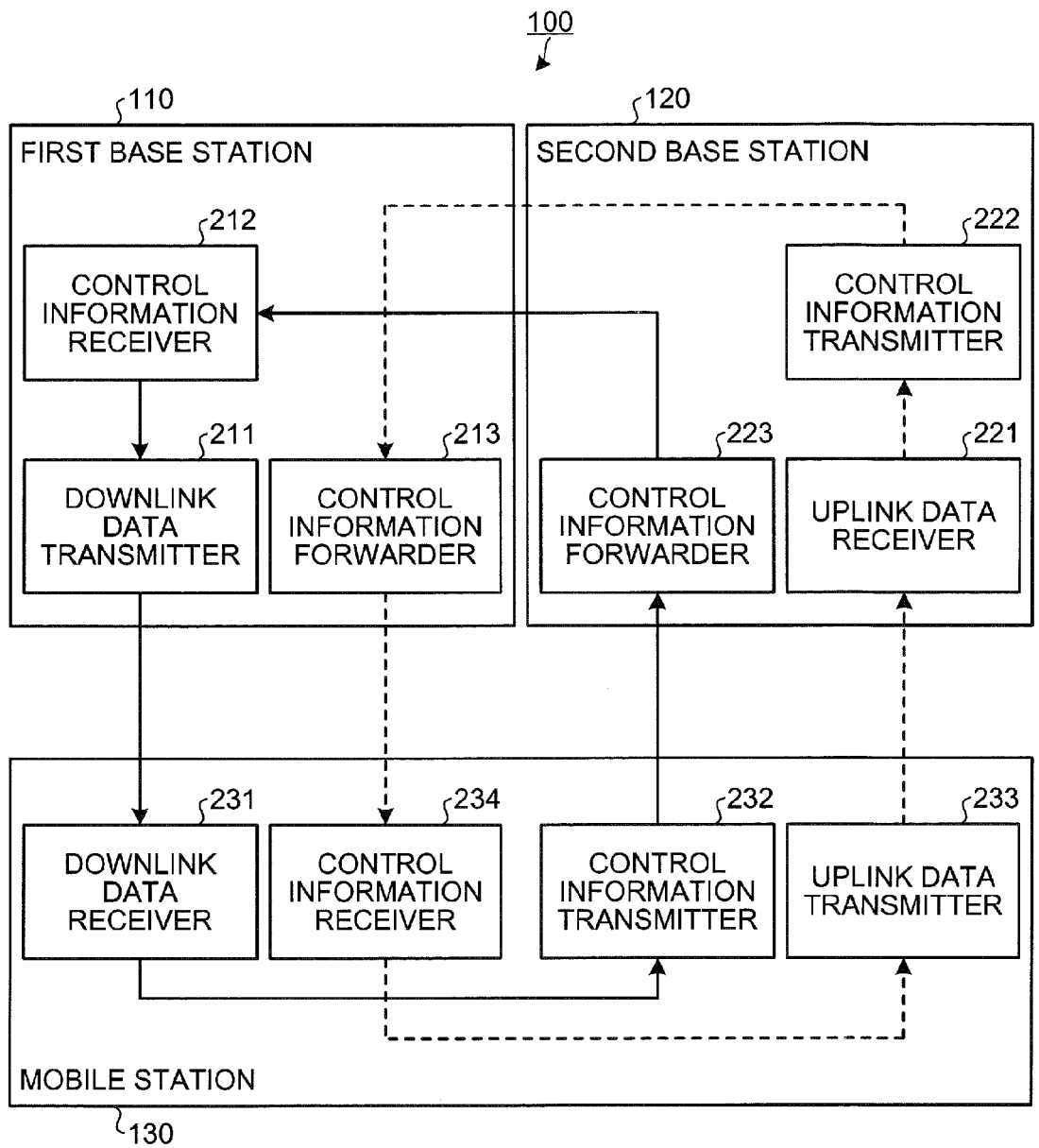
FIGS. 2 and 3 are block diagrams of exemplary configurations of each station in the communication system.

FIG. 2 is a block diagram of a configuration example of each station in the communication system. In FIG. 2, elements substantially identical to those described in FIG. 1 are denoted by the same reference numerals used in FIG. 1 and are omitted from further description. In FIG. 2, a solid lined arrow represents signal flow through a downlink, and a dotted lined arrow represents signal flow through an uplink. FIG. 2 depicts configurations of each station for carrying out the uplink/downlink asymmetrical connection.

The first base station 110 includes a downlink data transmitter 211, a control information receiver 212, and a control information forwarder 213. The downlink data transmitter 211 transmits downlink data to the mobile station 130, based on feedback information that is from the mobile station 130 and output from the control information receiver 212. For example, the downlink data transmitter 211 adjusts a downlink data transmission condition, based on CQI output from the control information receiver 212, and also controls retransmission of the downlink data, based on delivery acknowledgement information (Ack/Nack) output from the control information receiver 212.

The control information receiver 212 receives from the mobile station 130, feedback information concerning the downlink data transmitted by the downlink data transmitter 211. At this time, the control information receiver 212 receives the feedback information through a detour path passing through the second base station 120. The control information receiver 212 may receive the feedback information through a path selected from among a detour path passing through the second base station 120 and a direct path not passing through the second base station 120. The control information receiver 212 outputs the received feedback information to the downlink data transmitter 211.

The detour path passing through the second base station 120 is a path through which data is transmitted by radio transmission from the mobile station 130 to the second base station 120 and by inter-station transmission from the second base station 120 to the first base station 110. The detour path passing through the second base station 120 may be a path through which data is transmitted by radio transmission from the mobile station 130 to the second base station 120 via a radio relay station and by inter-station transmission from the second base station 120 to the first base station 110. Multiple detour paths passing through the second base station 120 may be used.

A direct path not passing through the second base station 120 is a path through which data is transmitted by radio transmission from the mobile station 130 to the first base station 110. The direct path not passing through the second base station 120 may be a path through which data is transmitted by radio transmission from the mobile station 130 to the first base station 110 via a radio relay station. Multiple direct paths not passing through the second base station 120 may be used.

The control information forwarder 213 forwards to the mobile station 130, feedback information transmitted from the second base station (another base station). The feedback information forwarded by the control information forwarder 213 is feedback information that is transmitted from the second base station 120 to the mobile station 130 and concerns uplink data transmitted from the mobile station 130 to the second base station 120.

The second base station 120 includes an uplink data receiver 221, a control information transmitter 222, and a control information forwarder 233. The uplink data receiver 221 receives uplink data transmitted from the mobile station 130, and also outputs feedback information concerning the received uplink data to the control information transmitter 222. For example, the uplink data receiver 221 outputs UL Grant to cause the mobile station 130 to adjust an uplink data transmission condition. The uplink data receiver 221 outputs delivery acknowledgement information (Ack/Nack) on the received uplink data to make a request for retransmission of uplink data.

The control information transmitting unit 222 transmits feedback information transmitted to the mobile station 130 from the uplink data transmitting unit 221. At this time, the control information transmitting unit 222 transmits the feedback information to the mobile station 130, through a detour path passing through the first base station 110. The control information transmitting unit 222 may transmit the feedback information through a path selected from among a detour path passing through the first base station 110 and a direct path not passing through the first base station 110.

The detour path passing through the first base station 110 is a path through which data is transmitted by inter-station transmission from the second base station 120 to the first base station 110 and by radio transmission from the first base station 110 to the mobile station 130. Further, the detour path passing through the first base station 110 may be a path through which data is transmitted by inter-station transmission from the second base station 120 to the first base station 110 and via a radio relay station, from the first base station 110 to the mobile station 130. Multiple detour paths passing through the first base station 110 may be used.

A direct path not passing through the first base station 110 is a path through which data is transmitted by radio transmission from the second base station 120 to the mobile station 130. Further, the direct path not passing through the first base station 110 may be a path through which data is transmitted by radio transmission from the second base station 120 to the mobile station 130 via a radio base station. Multiple direct paths not passing through the first base station 110 may be used.

The control information forwarding unit 223 forwards to the first base station 110 (another base station), feedback information transmitted from the mobile station 130. The feedback information forwarded by the control information forwarding unit 223 is feedback information that is transmitted from the first base station 110 to the mobile station 130 and concerns downlink data transmitted from the first base station 110 to the mobile station 130.

The mobile station 130 includes a downlink data receiver 231, a control information transmitter 232, an uplink data transmitter 233, and a control information receiver 234. The downlink data receiver 231 receives downlink data from the first base station 110, and also outputs feedback information concerning the received downlink data to the control information transmitter 232.

For example, the downlink data receiver 231 outputs CQI to cause the downlink data transmitter 211 of the first base station 110 to adjust a transmission condition. The downlink data receiver 231 outputs delivery acknowledgement information (Ack/Nack) concerning the received downlink data to make a request for retransmission of downlink data.

The control information transmitter 232 transmits feedback information output from the downlink data receiver 231 to the first base station 110. At this time, the control information transmitter 232 transmits the feedback information to the first base station 110 through the detour path passing through the second base station 120. The control information transmitter 232 may transmit the feedback information through a path selected from among a detour path passing through the second base station 120 and a direct path directly to the first base station 110.

The uplink data transmitter 233 transmits uplink data to the second base station 120, based on feedback information that is from the second base station 120 and is output from the control information receiver 234. For example, the uplink data transmitter 233 adjusts an uplink data transmission condition, based on UL Grant output from the control information receiver 234. The uplink data transmitter 233 also controls retransmission of the uplink data, based on delivery acknowledgement information (Ack/Nack) output from the control information receiver 234.

The control information receiver 234 receives from the second base station 120, feedback information concerning uplink data transmitted by the uplink data transmitter 233. At this time, the control information receiver 234 receives the feedback information through a detour path passing through the first base station 110. The control information receiver 234 may receive the feedback information through a path selected from among a detour path passing through the first base station 110 and the direct path from the second base station 120. The control information receiver 234 outputs the received feedback information to the uplink data transmitter 233.

Figure 3:
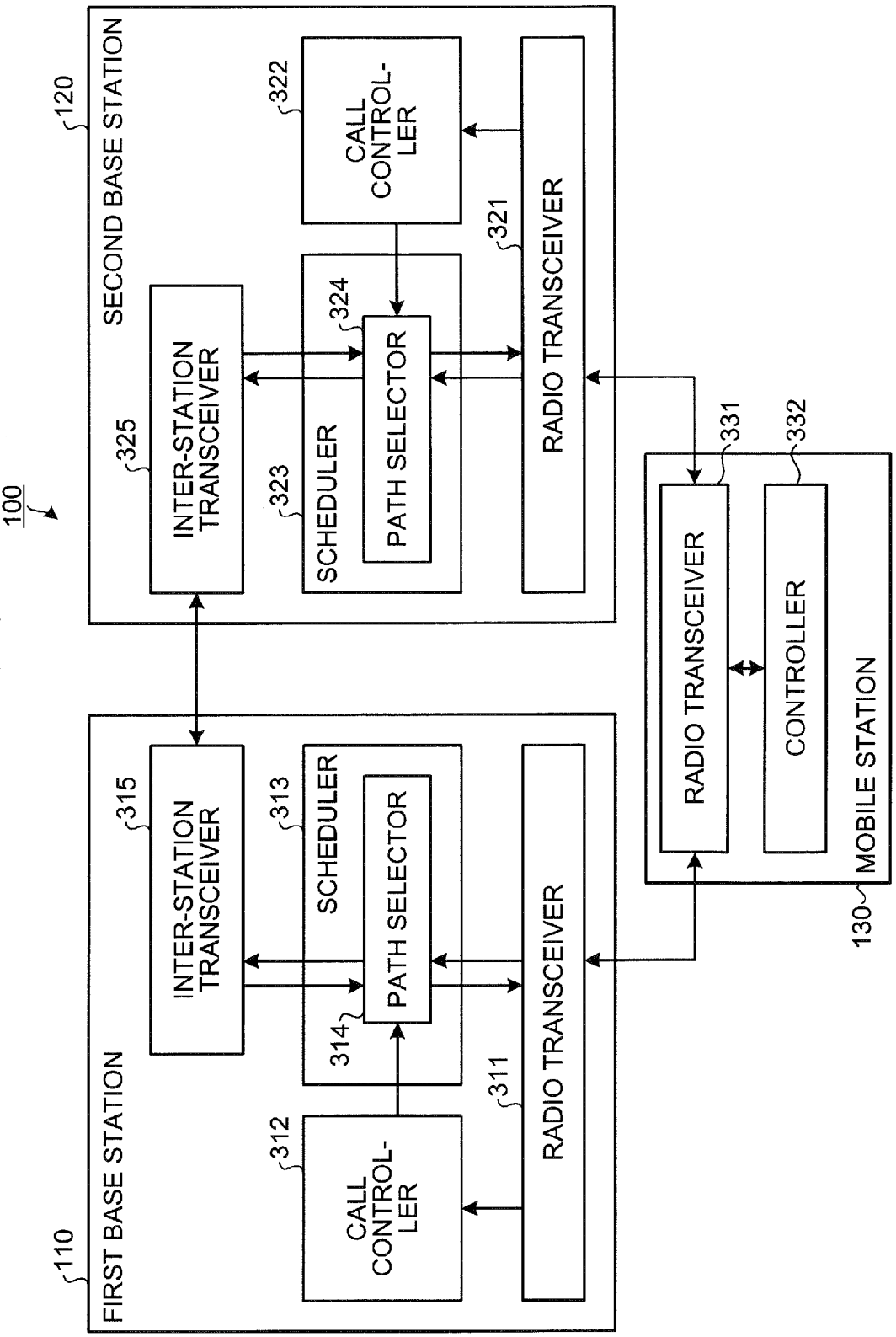

FIG. 3 is a block diagram of an exemplary configuration of each station in the communication system. As depicted in FIG. 3, the first base station 110 includes a radio transceiver 311, a call controller 312, a scheduler 313, a path selector 314, and an inter-station transceiver 315. The downlink data transmitter 211 depicted in FIG. 2 is, for example, implemented by the radio transceiver 311. The control information receiver 212 and the control information forwarder 213 depicted in FIG. 2 are, for example, implemented by the radio transceiver 311 and the inter-station transceiver 315, respectively.

The radio transceiver 311 carries out radio communication with the mobile station 130. For example, the radio transceiver 311 transmits downlink data to the mobile station 130, and also receives a connection request (including an asymmetrical connection request) transmitted from the mobile station 130. The asymmetrical connection request is a request for carrying out downlink data communication between the mobile station 130 and the first base station 110 and for carrying out uplink data communication between the mobile station 130 and the second base station 120. The radio transceiver 311 outputs the received asymmetrical connection request to the call controller 312.

The radio transceiver 311 serves as the measuring device that measures the propagation quality of a downlink from the first base station 110 to the mobile station 130. Measurement of the downlink propagation quality is carried out by, for example, transmitting a pilot signal from the first base station 110 to the mobile station 130 and receiving from the mobile station 130, quality information indicative of the propagation quality measured at the mobile station 130, based on the pilot signal.

The radio transceiver 311 further serves as a measuring device that measures the propagation quality of an uplink from the mobile station 130 to the first base station 110. Measurement of the uplink propagation quality is carried out by, for example, receiving a pilot signal transmitted from the mobile station 130. The radio transceiver 311 outputs to the scheduler 313, radio channel information including the measured propagation quality. The radio transceiver 311 transmits to the mobile station 130, path information output from the path selector 314.

The call controller 312 carries out call control, such as control of initial access, handover, etc., by each mobile station (e.g., mobile station 130), based on a connection request output from the radio transceiver 311. The call controller 312 acquires an asymmetrical connection request included in the connection request output from the radio transceiver 311 and outputs to the scheduler 313, the acquired asymmetrical connection request.

The scheduler 313 carries out scheduling of data communication between the first base station 110 and each mobile station (e.g., mobile station 130) connected to the first base station 110, based on, for example, radio channel information output from radio transceiver 311. Scheduling carried out by the scheduler 313 includes, for example, allocation of radio resources for communication between the first base station 110 and each mobile station.

The scheduler 313 includes the path selector 314, which selects a feedback path for transmitting feedback information concerning data. For example, the path selector 314 selects based on a connection request from the call controller 312, a feedback path for feedback on data transmitted/received by the radio transceiver 311. The path selector 314 outputs path information indicative of the result of feedback path selection to the radio transceiver 311 and to the inter-station transceiver 315.

The inter-station transceiver 315 communicates with the second base station 120. For example, the inter-station transceiver 315 communicates with the second base station 120 by wired communication using an X2 interface, optical cable, etc., conforming to the LTE standard. The inter-station transceiver 315 may communicate with the second base station 120 by radio communication. For example, the inter-station transceiver 315 with respect to the second base station 120, transmits/receives various control signals including path information and feedback information.

As depicted in FIG. 3, the second base station 120 includes a radio transceiver 321, a call controller 322, a scheduler 323, a path selector 324, and an inter-station transceiver 325. The basic configuration of the radio transceiver 321, the call controller 322, the scheduler 323, the path selector 324, and the inter-station transceiver 325 is substantially identical to the basic configuration of the radio transceiver 311, the call controller 312, the scheduler 313, the path selector 314, and the inter-station transceiver 315.

The data receiver 221 depicted in FIG. 2 is, for example, implemented by the radio transceiver 321. The control information transmitter 222 and the control information forwarder 223 depicted in FIG. 2 are, for example, implemented by the radio transceiver 321 and the inter-station transceiver 325, respectively.

The radio transceiver 321 communicates with the mobile station 130. For example, radio transceiver 321 receives uplink data from the mobile station 130. The radio transceiver 321 serves as the measuring unit that measures the propagation quality of a downlink from the second base station 120 to the mobile station 130. Measurement of the downlink propagation quality is carried out by, for example, transmitting a pilot signal from the second base station 120 to the mobile station 130 and receiving from the mobile station 130, quality information indicative of a propagation quality measured based on the pilot signal at the mobile station 130.

The radio transceiver 321 further serves as a measuring unit that measures the propagation quality of an uplink from the mobile station 130 to the second base station 120. Measurement of the uplink propagation quality is carried out by, for example, receiving a pilot signal transmitted from the mobile station 130.

The mobile station 130 includes a radio transceiver 331 and a controller 332. The downlink data receiver 231, the control information transmitter 232, the uplink data transmitter 233, and the control information receiver 234 depicted in FIG. 2 are, for example, implemented by the radio transceiver 331. The radio transceiver 331 carries out radio communication with the first base station 110 and with the second base station 120.

The radio transceiver 331 serves as a measuring unit that measures the propagation quality of a downlink from the first base station 110 and the propagation quality of a downlink from the second base station 120. The radio transceiver 331 further serves as a measuring unit that measures the propagation quality of an uplink to the first base station 110 and the propagation quality of an uplink to the second base station 120.

The radio transceiver 331 further serves as a path information receiver that receives from the first base station 110 or the second base station 120, selection information indicative of the result of feedback path selection for uplink data and downlink data. The radio transceiver 331 transmits to the first base station 110 through a path indicated by received path information concerning the downlink data, feedback information concerning incoming downlink data from the first base station 110. The radio transceiver 331 receives from the second base station 120 through the path indicated by received path information concerning the uplink data, feedback information concerning uplink data transmitted to the second base station 120.

The controller 332 selects a base station to carry out uplink data communication with and a base station to carry out downlink data communication with, based on propagation qualities measured by the radio transceiver 331. If the same base station is selected for uplink and downlink communication (i.e., uplink/downlink asymmetrical connection is not carried out), the controller 332 transmits a normal connection request to the selected base station via the radio transceiver 331.

If the selected base stations are different from each other, the controller 332 transmits an asymmetrical connection request to each of the selected base stations via the radio transceiver 331. The asymmetrical connection request is a signal requesting an uplink/downlink asymmetrical connection, including information indicative of a base station to carry out uplink data communication with and a base station to carry out downlink data communication with.

The call controllers 312 and 322, the schedulers 313 and 323, and the controller 332 are, for example, implemented by a processing unit, such as a digital signal processor (SDP).

Figure 4:
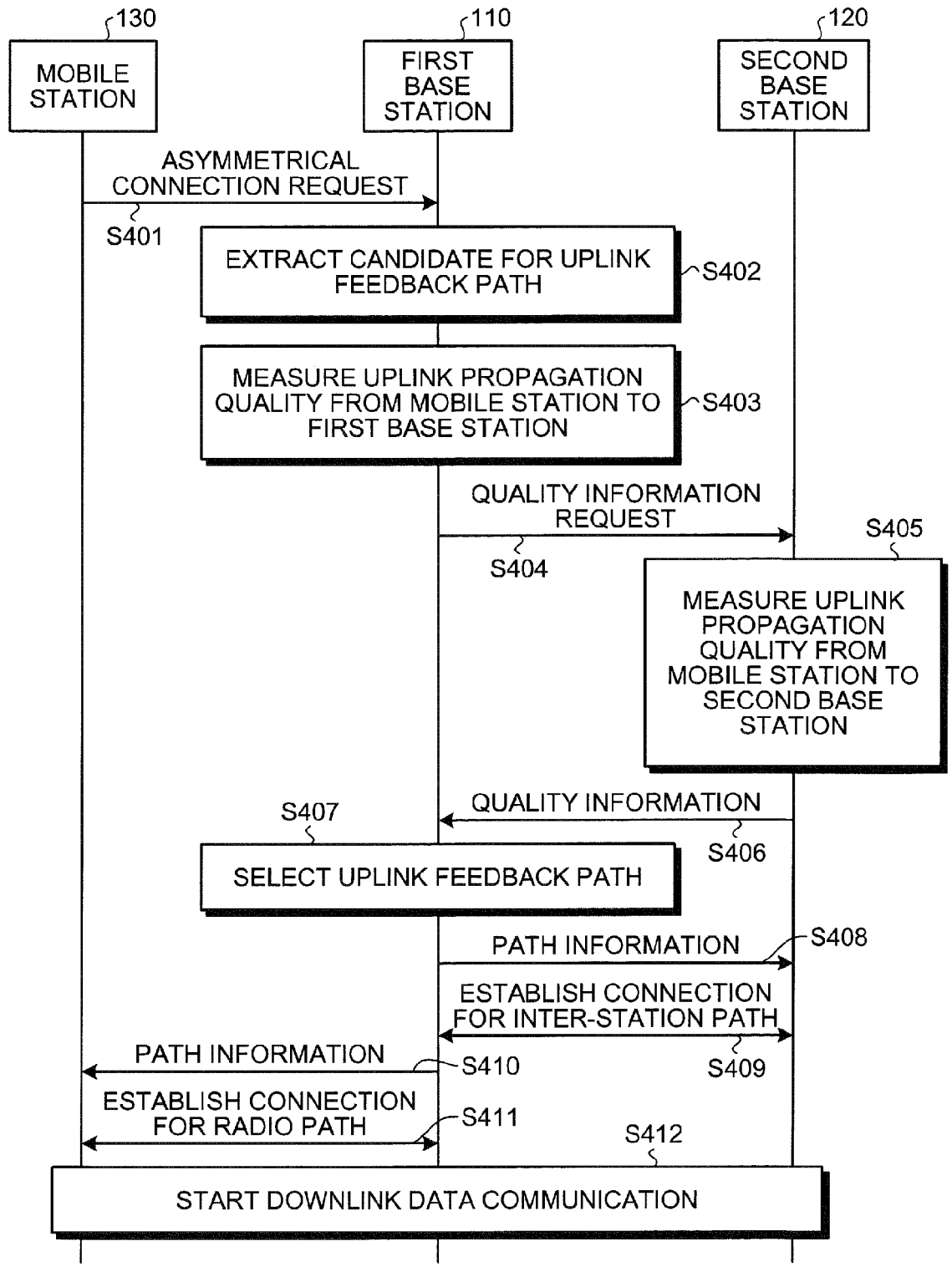
FIG. 4 is a sequence diagram of a downlink data communication process according to a first operation example of the communication system.

FIG. 4 is a sequence diagram of a downlink data communication process according to a first operation example of the communication system. FIG. 4 depicts the first operation example in which the first base station 110 selects a feedback path for transmitting feedback information concerning downlink data and the second base station 120 selects a feedback path for transmitting feedback information concerning uplink data. FIG. 4 further depicts a process related to downlink data communication carried out by the communication system 100.

The mobile station 130 transmits an asymmetrical connection request to the first base station 110 (step S401). The first base station 110 then extracts candidates for an uplink feedback path from the mobile station 130 to the first base station 110 (step S402). For example, the first base station 110 extracts a direct path for direct transmission from the mobile station 130 to the first base station 110 and a detour path passing through the second base station 120, as uplink feedback paths.

Subsequently, the first base station 110 measures the propagation quality of an uplink from the mobile station 130 to the first base station 110 (step S403). At step S403, the first base station 110 may acquire a propagation quality measured in advance. The first base station 110 then transmits to the second base station 120, a quality information request for uplink quality information (step S404).

In response to the quality information request transmitted at step S404, the second base station 120 measures the propagation quality of an uplink from the mobile station 130 to the second base station 120 (step S405). At step S405, the second base station 120 may acquire a propagation quality measured in advance. The second base station 120 then transmits to the first base station 110, a quality information indicative of the uplink propagation quality measured at step S405 (step S406).

Subsequently, the first base station 110 selects based on the propagation quality measured at step S403 and the quality information transmitted at step S406, one of the feedback path candidates extracted at step S402 (step S407). For example, if the propagation quality from the mobile station 130 to the first base station 110 is equal to or higher than the propagation quality from the mobile station 130 to the second base station 120, the first base station 110 selects the direct path for direct transmission from the mobile station 130 to the first base station 110, as the feedback path.

If the propagation quality from the mobile station 130 to the first base station 110 is lower than the propagation quality from the mobile station 130 to the second base station 120, the first base station 110 selects the detour path passing through the second base station 120, as the feedback path. In this operation example, the first base station 110 selects the detour path passing through the second base station 120, as the feedback path.

The first base station 110 then transmits to the second base station 120, path information indicative of the result of feedback path selection at step S407 (step S408). Based on the path information transmitted at step S408, the second base station 120 makes setting for forwarding from the second base station 120 to the first base station 110, feedback information transmitted from the mobile station 130.

Subsequently, the first base station 110 and the second base station 120 establish connection for an inter-station path between the first base station 110 and the second base station 120 for transmission of feedback information concerning downlink data communication through the detour path passing through the second base station 120 (step S409). The first base station 110 then transmits to the mobile station 130, the path information indicative of the result of feedback path selection at step S407 (step S410).

Based on the path information transmitted at step S410, the mobile station 130 makes setting for transmitting to the first base station 110 and through the detour path passing through the second base station 120, feedback information concerning downlink data from the first base station 110. Subsequently, the first base station 110 and the mobile station 130 establish a radio path connection therebetween for transmission of downlink data from the first base station 110 to the mobile station 130 (step S411).

Subsequently, the first base station 110 starts transmitting downlink data to the mobile station 130 (step S412), after which a series of operations comes to an end. In the downlink data communication at step S412, feedback information concerning the downlink data is transmitted from the mobile station 130 to the first base station 110 through the detour path passing through the second base station 120.

Figure 5:
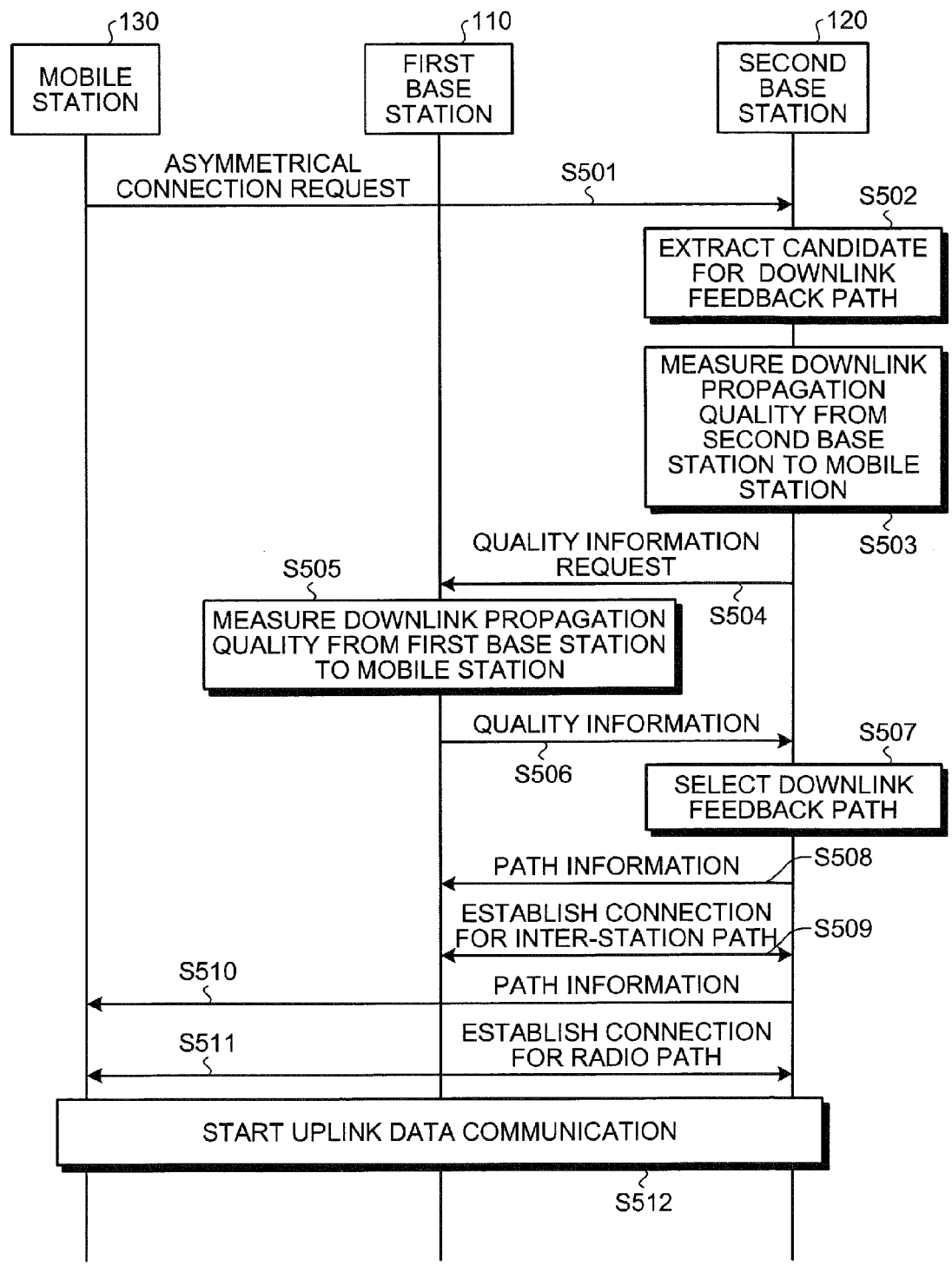
FIG. 5 is a sequence diagram of an uplink data communication process according to a first operation example of the communication system.

FIG. 5 is a sequence diagram of an uplink data communication process according to a first operation example of the communication system. FIG. 5 depicts the first operation example in which, similar to FIG. 4, the first base station 110 selects a feedback path for transmitting feedback information concerning downlink data and the second base station 120 selects a feedback path for transmitting feedback information concerning uplink data. FIG. 5 further depicts a process related to uplink data communication carried out by the communication system 100.

The mobile station 130 transmits an asymmetrical connection request to the second base station 120 (step S501). The second base station 120 then extracts candidates for a downlink feedback path from the second base station 120 to the mobile station 130 (step S502). For example, the second base station 120 extracts a direct path for direct transmission from the second base station 120 to the mobile station 130 and a detour path passing through the first base station 110, as downlink feedback paths.

Subsequently, the second base station 120 measures the propagation quality of a downlink from the second base station 120 to the mobile station 130 (step S503). At step S503, the second base station 120 may acquire a propagation quality measured in advance. The second base station 120 then transmits to the first base station 110, a quality information request for downlink quality information (step S504).

In response to the quality information request transmitted at step S504, the first base station 110 measures the propagation quality of a downlink from the first base station 110 to the mobile station 130 (step S505). At step S505, the first base station 110 may acquire a propagation quality measured in advance. The first base station 110 then transmits to the second base station 120, quality information indicative of the downlink propagation quality measured at step S505 (step S506).

Subsequently, the second base station 120 selects based on the propagation quality measured at step S503 and the quality information transmitted at step S506, one of the feedback path candidates extracted at step S502 (step S507). For example, if the propagation quality from the second base station 120 to the mobile station 130 is equal to or higher than the propagation quality from the first base station 110 to the mobile station 130, the second base station 120 selects the direct path for direct transmission from the second base station 120 to the mobile station 130, as the feedback path.

If the propagation quality from the second base station 120 to the mobile station 130 is lower than the propagation quality from the first base station 120 to the mobile station 130, the second base station 120 selects the detour path passing through the first base station 110, as the feedback path. In this operation example, the second base station 120 selects the detour path passing through the first base station 110, as the feedback path.

The second base station 120 then transmits to the first base station 110, path information indicative of the result of feedback path selection at step S507 (step S508). Based on the path information transmitted at step S508, the first base station 110 makes setting for forwarding from the first base station 110 to the mobile station 130, feedback information transmitted from the second base station 120.

Subsequently, the second base station 120 and the first base station 110 establish connection for an inter-station path between the second base station 120 and the first base station 110 for transmission of feedback information concerning uplink data communication through the detour path passing through the first base station 110 (step S509). The second base station 120 then transmits to the mobile station 130, the path information indicative of the result of feedback path selection at step S507 (step S510).

Based on the path information transmitted at step S510, the mobile station 130 makes setting for receiving from the second base station 120 and through the detour path passing through the first base station 110, feedback information concerning uplink data from the second base station 120. Subsequently, the second base station 120 and the mobile station 130 establish a radio path connection therebetween for transmission of uplink data from the mobile station 130 to the second base station 120 (step S511).

Subsequently, the mobile station 130 starts transmitting uplink data to the second base station 120 (step S512), after which a series of operations comes to an end. In the uplink data communication at step S512, feedback information concerning the uplink data is transmitted from the second base station 120 to the mobile station 130 through the detour path passing through the first base station 110.

An example in which the first base station 110 selects the feedback path for feedback on downlink data and the second base station 120 selects the feedback path for feedback on uplink data is described referring to FIGS. 4 and 5. An example in which the first base station 110 selects both feedback paths for feedback on downlink data and on uplink data is described with reference to FIG. 6.

Figure 6:
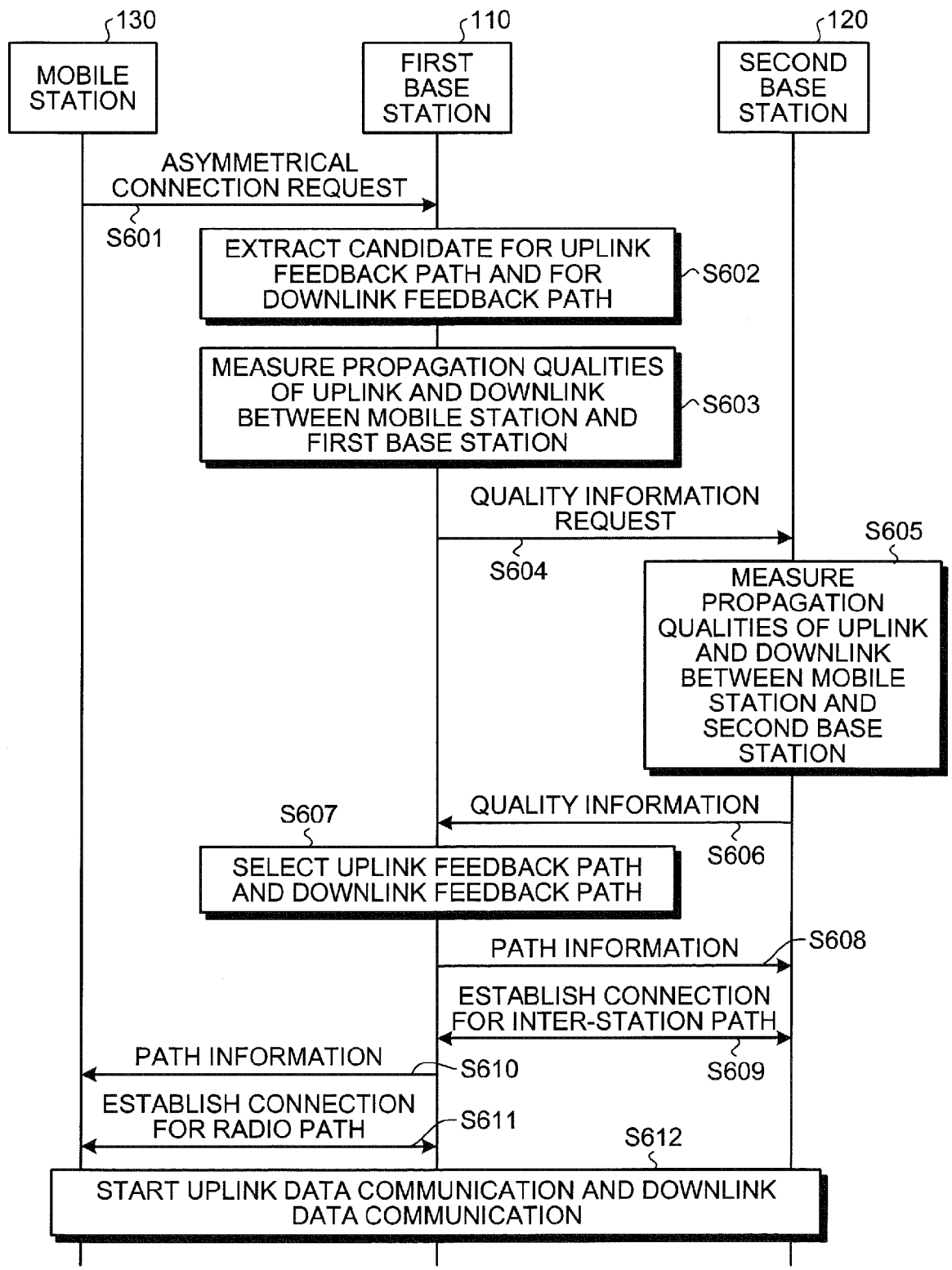
FIG. 6 is a sequence diagram of an uplink/downlink data communication process according to a second operation example of the communication system.

FIG. 6 is a sequence diagram of an uplink/downlink data communication process according to a second operation example of the communication system. FIG. 6 depicts the second operation example in which the first base station 110 selects both a feedback path for transmitting feedback information concerning downlink data and a feedback path for transmitting feedback information concerning uplink data.

The mobile station 130 transmits an asymmetrical connection request to the first base station 110 (step S601). The first base station 110 then extracts candidates for an uplink feedback path and for a downlink feedback path (step S602). For example, the first base station 110 extracts a direct path for direct transmission from the mobile station 130 to the first base station 110 and a detour path passing through the second base station 120, as uplink feedback paths. The first base station 110 further extracts a direct path for direct transmission from the second base station 120 to the mobile station 130 and a detour path passing through the first base station 110, as downlink feedback paths.

Subsequently, the first base station 110 measures the propagation quality of an uplink from the mobile station 130 to the first base station 110 and the propagation quality of a downlink from the first base station 110 to the mobile station 130 (step S603). At step S603, the first base station 110 may acquire propagation qualities measured in advance. The first base station 110 then transmits a quality information request for uplink/downlink quality information to the second base station 120 (step S604).

In response to the quality information request transmitted at step S604, the second base station 120 measures the propagation quality of an uplink from the mobile station 130 to the second base station 120 and the propagation quality of a downlink from the second base station 120 to the mobile station 130 (step S605). At step S605, the second base station 120 may acquire propagation qualities measured in advance. The second base station 120 then transmits to the first base station 110, quality information indicative of the propagation qualities of the uplink and the downlink measured at step S605 (step S606).

Subsequently, the first base station 110 selects one of the uplink feedback path candidates and one of the downlink feedback path candidates, both feedback path candidates being extracted at step S602 (step S607). The selection at step S607 is carried out based on the propagation qualities measured at step S603 and the quality information transmitted at step S606.

For example, for downlink data communication, when the propagation quality of the uplink from the mobile station 130 to the first base station 110 is equal to or higher than the propagation quality of the uplink from the mobile station 130 to the second base station 120, the first base station 110 selects the direct path as the uplink feedback path. For downlink data communication, when the propagation quality of the uplink from the mobile station 130 to the first base station 110 is lower than the propagation quality of the uplink from the mobile station 130 to the second base station 120, the first base station 110 selects the detour path as the uplink feedback path. In this example, the first base station 110 selects the detour path as the uplink feedback path.

For uplink data communication, when the propagation quality of the downlink from the second base station 120 to the mobile station 130 is equal to or higher than the propagation quality of the downlink from the first base station 110 to the mobile station 130, the first base station 110 selects the direct path as the downlink feedback path. For uplink data communication, when the propagation quality of the downlink from the second base station 120 to the mobile station 130 is lower than the propagation quality of the downlink from the first base station 110 to the mobile station 130, the first base station 110 selects the detour path as the downlink feedback path. In this example, the first base station 110 selects the detour path as the downlink feedback path.

The first base station 110 then transmits to the second base station 120, path information indicative of the result of feedback path selection at step S607 (step S608). Based on the path information transmitted at step S608, the second base station 120 makes setting for forwarding from the second base station 120 to the first base station 110, feedback information transmitted from the mobile station 130. Based on the path information transmitted at step S608, the second base station 120 also makes setting for transmitting to the mobile station 130 through the detour path, feedback information concerning uplink data.

Subsequently, the first base station 110 and the second base station 120 establish connection for the inter-station path between the first base station 110 and the second base station 120 (step S609). The connection established at step S609 is a connection for transmitting feedback information concerning downlink data through the detour path passing through the second base station 120 and is a connection for transmitting feedback information concerning uplink data through the detour path passing through the first base station 110.

The first base station 110 then transmits path information indicative of the result of feedback path selection at step S607 to the mobile station 130 (step S610). Based on the path information transmitted at step S610, the mobile station 130 makes setting for transmitting to the first base station 110 through the detour path passing through the second base station 120, feedback information concerning downlink data from the first base station 110. Based on the path information transmitted at step S610, the mobile station 130 also makes setting for receiving from the second base station 120 through the detour path passing through the first base station 110, feedback information concerning uplink data to the second base station 120.

Subsequently, the first base station 110 and the mobile station 130 establish connection for a radio path between the first base station 110 and the mobile station 130 for transmission of downlink data from the first base station 110 to the mobile station 130 (step S611). The first base station 110 then starts transmitting downlink data to the mobile station 130 and the mobile station 130 starts transmitting uplink data to the second base station 120 (step S612), after which a series of operations comes to an end.

In downlink data communication at step S612, feedback information concerning the downlink data is transmitted to the first base station 110 through the detour path passing through the second base station 120. In uplink data communication at step S612, feedback information concerning the uplink data is transmitted to the mobile station 130 through the detour path passing through the first base station 110.

Figure 7:
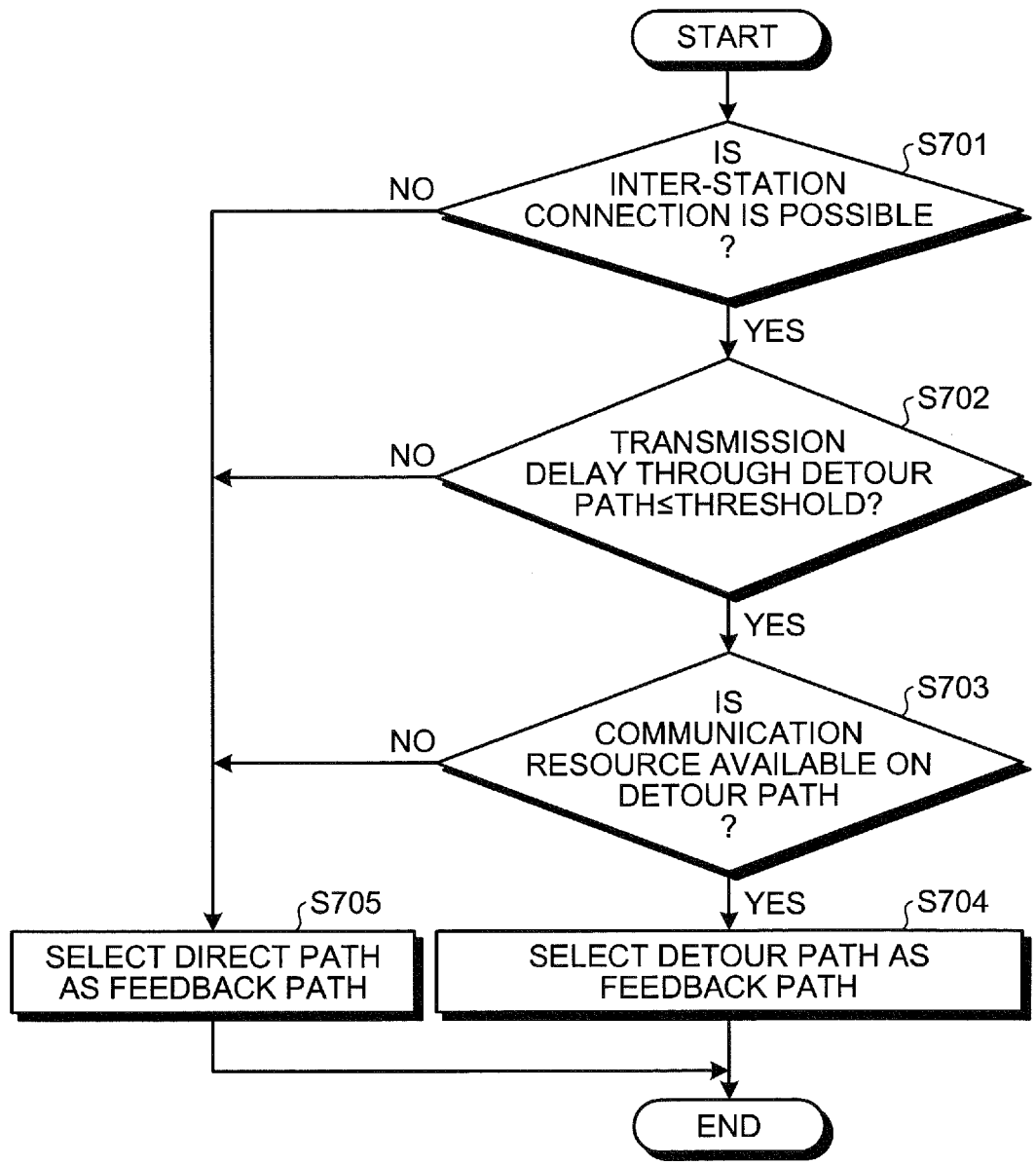
FIG. 7 is a flowchart of a first example of feedback path selection.

FIG. 7 is a flowchart of a first example of feedback path selection. FIG. 7 depicts an example where the path selector 314 of the first base station 110 selects a feedback path for feedback on downlink data. As depicted in FIG. 7, the path selector 314 first determines whether inter-station connection with the second base station 120 is possible (step S701).

If the inter-station connection is impossible at step S701 (step S701: NO), the operation flow proceeds to step S705. If the inter-station connection is possible (step S701: YES), the path selector 314 determines whether transmission delay in the transmission of feedback information through the detour path passing through the second base station 120a given threshold (step S702). If the transmission delay in transmission through the detour path exceeds the given threshold (step S702: NO), the operation flow proceeds to step S705.

If the transmission delay in transmission through the detour path is equal to or smaller than the given threshold (step S702: YES), the path selector 314 determines whether an allocable communication resource is available on the detour path passing through the second base station 120 (step S703). If an allocable communication resource is available (step S703: YES), the detour path passing through the second base station 120 is selected as the feedback path (step S704), after which a series of operations comes to an end.

If no allocable communication resource is available at step S703 (step S703: NO), a direct path for direct transmission between the first base station 110 and the mobile station 130 is selected as the feedback path (step S705), after which the series of operations comes to an end. Through these operations, the path selector 314 determines whether the detour path passing through the second base station 120 is exploitable and if the detour path is unexploitable, the path selector 314 is able to select a direct path between the first base station 110 and the mobile station 130, as the feedback path.

At step S701, for example, if a physical connection is not present or a physical connection is present but the inter-station connection cannot be established between the first base station 110 and the second base station 120, the path selector 314 determines that the inter-station connection is impossible. The path selector 314, for example, makes an inquiry to a superior system administrating inter-state communication to acquire information concerning the possibility of the inter-state connection, and makes the determination based on the acquired information. If inter-state connection with the second base station 120 is determined to be impossible at step S701, the path selector 314 determines that the detour path is unexploitable.

At step S702, for example, the path selector 314 makes an inquiry to the superior system administrating inter-state communication to acquire information concerning the transmission delay, and makes the determination based on the acquired information. If the transmission delay in transmission of feedback information through the detour path passing through the second base station 120 exceeds the given threshold at step S702, the path selector 314 determines that the detour path is unexploitable.

At step S703, for example, the path selector 314 makes an inquiry to the second base station 120 to acquire information concerning radio resources, and makes the determination based on the acquired information. An allocable communication resource on the detour path passing through the second base station 120 is, for example, a radio resource that can be allotted for transmission of feedback information from the mobile station 130 to the second base station 120.

If no allocable communication resource is available on the detour path passing through the second base station 120 at step S703, the path selector 314 determines that the detour path is unexploitable. In this manner, when the detour path is used for transmission of other transmission information or is used as a feedback path for a mobile station other than the mobile station 130 and communication resources are insufficient, the path selector 314 is able to select a direct path as the feedback path.

In this manner, when the detour path cannot be used, a direct path between the first base station 110 and the mobile station 130 is selected as the feedback path, enabling feedback information to be transmitted in a flexible manner according to exploitability of the detour path. While an example of selecting a feedback path for feedback on downlink data is described herein, the selection operation as described in this example can apply to a case of selecting a feedback path for feedback on uplink data. The order of the operations at steps S701 to S703 may be changed and a portion of operations at steps S701 to S703 may be omitted.

Figure 8:
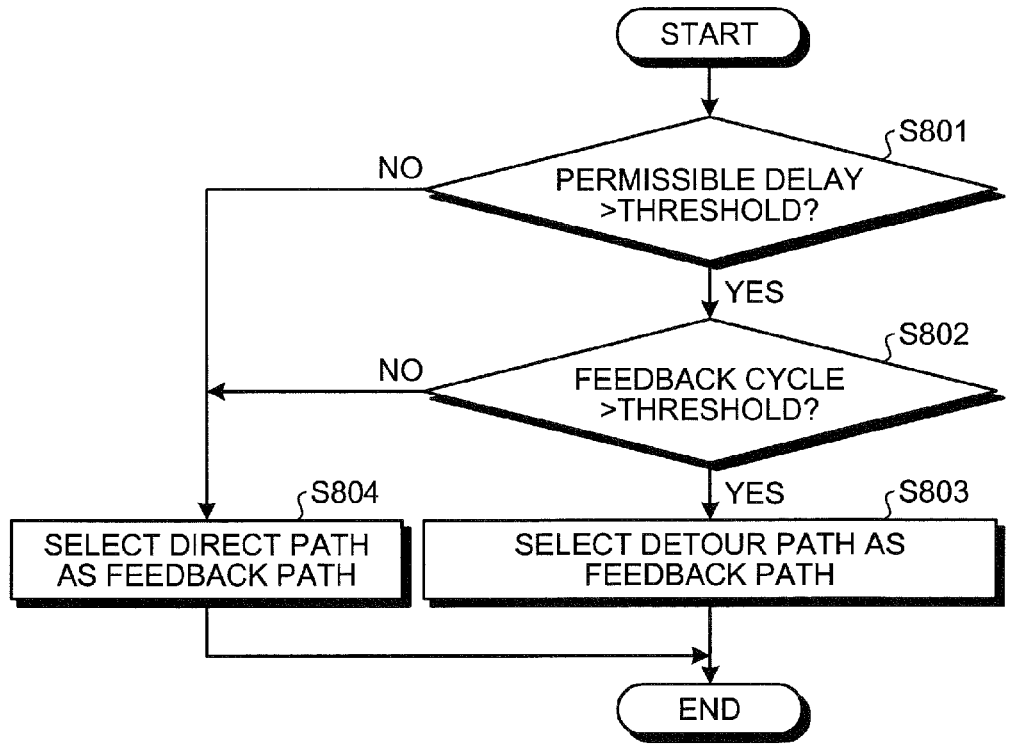
FIG. 8 is a flowchart of a second example of feedback path selection.

FIG. 8 is a flowchart of a second example of feedback path selection. Similar to FIG. 7, FIG. 8 depicts an example where the path selector 314 of the first base station 110 selects a feedback path for feedback on downlink data. As depicted in FIG. 8, the path selector 314 first determines whether a permissible delay for the feedback information to be transmitted exceeds a given threshold (step S801).

If the permissible delay is equal to or smaller than the given threshold (step S801: NO), the operation flow proceeds to step S804. If the permissible delay exceeds the given threshold (step S801: YES), the path selector 314 determines whether the feedback cycle of the feedback information to be transmitted exceeds a given threshold (step S802). If the feedback cycle exceeds the given threshold (step S802: YES), the path selector 314 selects a detour path passing through the second base station 120 as the feedback path (step S803), after which a series of operations comes to an end.

If the feedback cycle is equal to or smaller than the given threshold at step S802 (step S802: NO), the path selector 314 selects a direct path for direct transmission between the first base station 110 and the mobile station 130 as the feedback path (step S804), after which the series of operations comes to an end. Through these operations, the path selector 314 is able to select the feedback path according to the type of feedback information to be transmitted.

For example, a memory of the first base station 110 stores therein information concerning permissible delays for and the feedback cycle of feedback information, for each type of feedback information. For example, because feedback information in audio communication is required to be real-time information, a relatively small permissible delay is set for the feedback information. In contrast, because feedback information in data communication is allowed to have delay to a certain extent, a relatively large permissible delay is set for the feedback information.

At step S801, the path selector 314 makes the determination based on, for example, the information stored in the memory of the first base station 110. If the permissible delay for the feedback information to be transmitted is equal to or smaller than the given threshold at step S801, the path selector 314 selects the direct path between the first base station 110 and the mobile station 130 as the feedback path.

At step S802, the path selector 314 makes the determination based on, for example, the information stored in the memory of the first base station 110. If the feedback cycle of the feedback information to be transmitted is equal to or smaller than the given threshold at step S802, the path selector 314 selects the direct path between the first base station 110 and the mobile station 130 as the feedback path.

In this manner, a feedback path is selected according to the type of feedback information to be transmitted, enabling the feedback information to be transmitted in a flexible manner according to a quality and characteristics that the feedback information to be transmitted is to have. While an example of selecting a feedback path for feedback on downlink data is described herein, the selection operation as described in this example can apply to a case of selecting a feedback path for feedback on uplink data. The order of the operations at steps S801 to S802 may be changed and a portion of the operations at steps S801 to S802 may be omitted.

Figure 9:
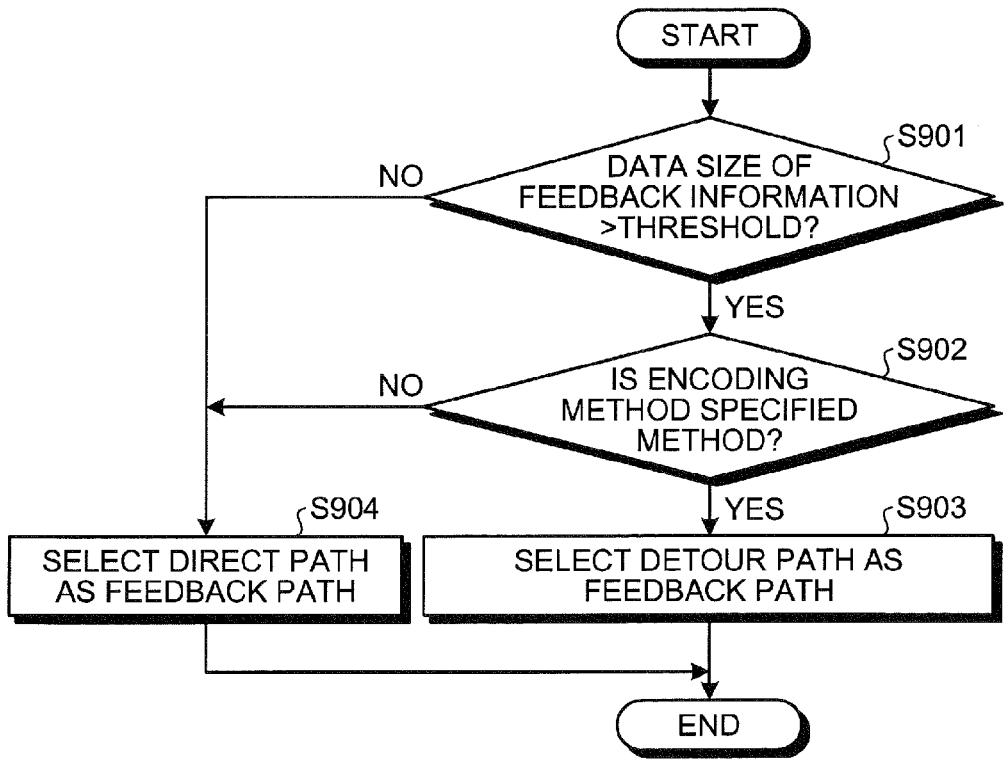
FIG. 9 is a flowchart of a third example of feedback path selection operation.

FIG. 9 is a flowchart of a third example of feedback path selection operation. Similar to FIG. 7, FIG. 9 depicts an example where the path selector 314 of the first base station 110 selects a feedback path for feedback on downlink data. As depicted in FIG. 8, the path selector 314 first determines whether the data size of feedback information to be transmitted exceeds a given threshold (step S901).

If the data size is equal to or smaller than the given threshold at step S901 (step S901: NO), the operation flow proceeds to step S904. If the data size exceeds the given threshold at step S901 (step S901: YES), the path selector 314 determines whether the encoding method for the feedback information to be transmitted is a specified method (step S902). If the encoding method is a specified method (step S902: YES), the path selector 314 selects the detour path passing through the second base station 120 as the feedback path (step S903), after which a series of operations comes to an end.

If the encoding method is not a specified method at step S902 (step S902: NO), the path selector 314 selects the direct path for direct transmission between the first base station 110 and the mobile station 130, as the feedback path (step S904), after which the series of operations comes to an end. Through these steps, the path selector 314 is able to select a feedback path according to the data size of and the encoding method for the feedback information.

For example, the memory of the first base station 110 stores therein information concerning the data size of feedback information for each type of feedback information. At step S901, the path selector 314 makes the determination based on, for example, the information stored in the memory of the first base station 110. If the feedback information to be transmitted is generated at the first base station 110, the path selector 314 may acquire the data size of the generated feedback information to make the determination based on the acquired data size.

If the data size of the feedback information to be transmitted is equal to or smaller than the given threshold at step S901, the path selector 314 selects the direct path between the first base station 110 and the mobile station 130, as the feedback path. As a result, when the feedback information is small in data size and is transmittable even under a low propagation quality, the direct path is selected preferentially to enable transmission of the feedback information in a short time.

For example, the memory of the first base station 110 stores therein for each type of feedback information, information concerning an encoding method for the feedback information and also stores therein information concerning specified methods among various encoding methods. A specified method is an encoding method by which transmission of feedback information becomes difficult when the propagation quality is low. Whether each encoding method is a specified method is predetermined according to error correction capability of the encoding method, radio resource consumption accompanying encoding rate variations corresponding to quality information concerning a communication path, etc.

For example, an encoding method offering high error correction capability and an encoding method causing less fluctuation of radio resource consumption resulting from encoding rate variations enable feedback information transmission even if a propagation quality is low and thus, are not determined to be specified methods. In contrast, an encoding method offering low error correction capability and an encoding method causing a non-negligible increase in radio resource consumption resulting from encoding rate variations make feedback information transmission difficult when a propagation quality is low and thus, are determined to be specified methods. As a result, when feedback information can be transmitted even if a propagation quality is low, the direct path is selected preferentially to enable transmission of the feedback information in a short time.

In this manner, a feedback path is selected according to the data size of and an encoding method for feedback information. As a result, when the feedback information can be transmitted even if the propagation quality is low, a direct path is selected preferentially to enable transmission of the feedback information in a short time. While an example of selecting a feedback path for feedback on downlink data is described herein, the selection operation as described in this example can apply to a case of selecting a feedback path for feedback on uplink data. The order of the operations at steps S901 to S902 changed and a portion of the operations at steps S901 to S902 may be omitted.

While the operation carried out by the path selector 314 of the first base station 110 for selection of a feedback path is described with reference to FIGS. 7 to 9, the operation carried out by the path selector 324 of the second base station 120 for selection of a feedback path is substantially identical to the described operation.

Figure 10:
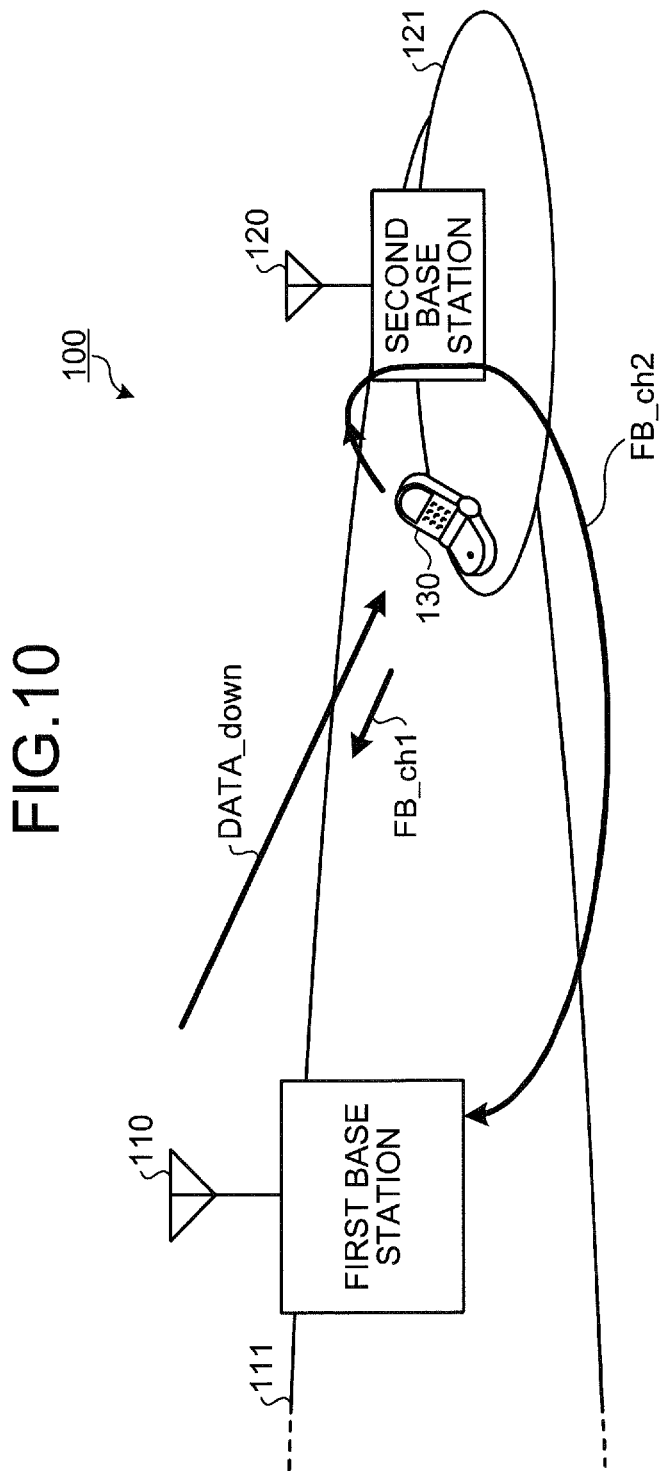
FIG. 10 is diagram of an example of candidate paths for feedback on downlink data.

FIG. 10 is diagram of an example of candidate paths for feedback on downlink data. In FIG. 10, elements substantially identical to those depicted in FIG. 1 are denoted by the same reference numerals used in FIG. 1. With reference to FIG. 10, selection of a feedback path for feedback on downlink data DATA_down transmitted from the first base station 110 to the mobile station 130 is described.

For example, the first base station 110 selects a feedback path for feedback on the downlink data DATA_down, from among feedback path candidates including a direct path FB_ch1 and a detour path FB_ch2. The direct path FB_ch1 is a path for direct radio transmission from the mobile station 130 to the first base station 110. The detour path FB_ch2 is a path for radio transmission from the mobile station 130 to the second base station 120 and inter-station transmission from the second base station 120 to the first base station 110.

FIG. 11 is a diagram of an example of selection from among the feedback paths in the example of FIG. 10. As depicted in a table 1100 of FIG. 11, feedback information concerning the downlink data DATA_down includes Ack/Nack information and CQI information. In this case, the first base station 110 (or second base station 120) selects, for example, a feedback path for the Ack/Nack information and a feedback path for the CQI information.

As depicted in a column 1110 of the table 1100, a permissible delay for the Ack/Nack information to be transmitted in the direction of "uplink" is relatively small (approximately several ms) and a permissible delay for the CQI information to be transmitted in the direction of "uplink" is relatively large (approximately several tens ms). As depicted in a column 1120 of the table 1100, the data size of the Ack/Nack information to be transmitted in the direction of "uplink" is relatively small (approximately 1 bit) and the data size of the CQI information to be transmitted in the direction of "uplink" is intermediate (approximately several bits).

An example is described in which the feedback path selection operations of FIG. 8 are adopted. It is assumed that the permissible delay (small) for the Ack/Nack information is equal to or smaller than the threshold while the permissible delay (large) for the CQI information exceeds the threshold at step S801 of FIG. 8. In this case, selection of the feedback path for the Ack/Nack information results in the direct path FB_ch1, while selection of the feedback path for the CQI information results in the detour path FB_ch2. Selection operation based on the operations at steps S802 and S803 of FIG. 8 may be carried out.

An example is described in which the feedback path selection operation of FIG. 9 is adopted. It is assumed that the data size (small) of the Ack/Nack information is equal to or smaller than the threshold while the data size (large) of the CQI information exceeds the threshold at step S901 of FIG. 9. In this case, selection of the feedback path for the Ack/Nack information results in the direct path FB_ch1, while selection of the feedback path for the CQI information results in the detour path FB_ch2. Selection operation based on the operations at steps S902 and S903 of FIG. 9 may be carried out.

Figure 12:
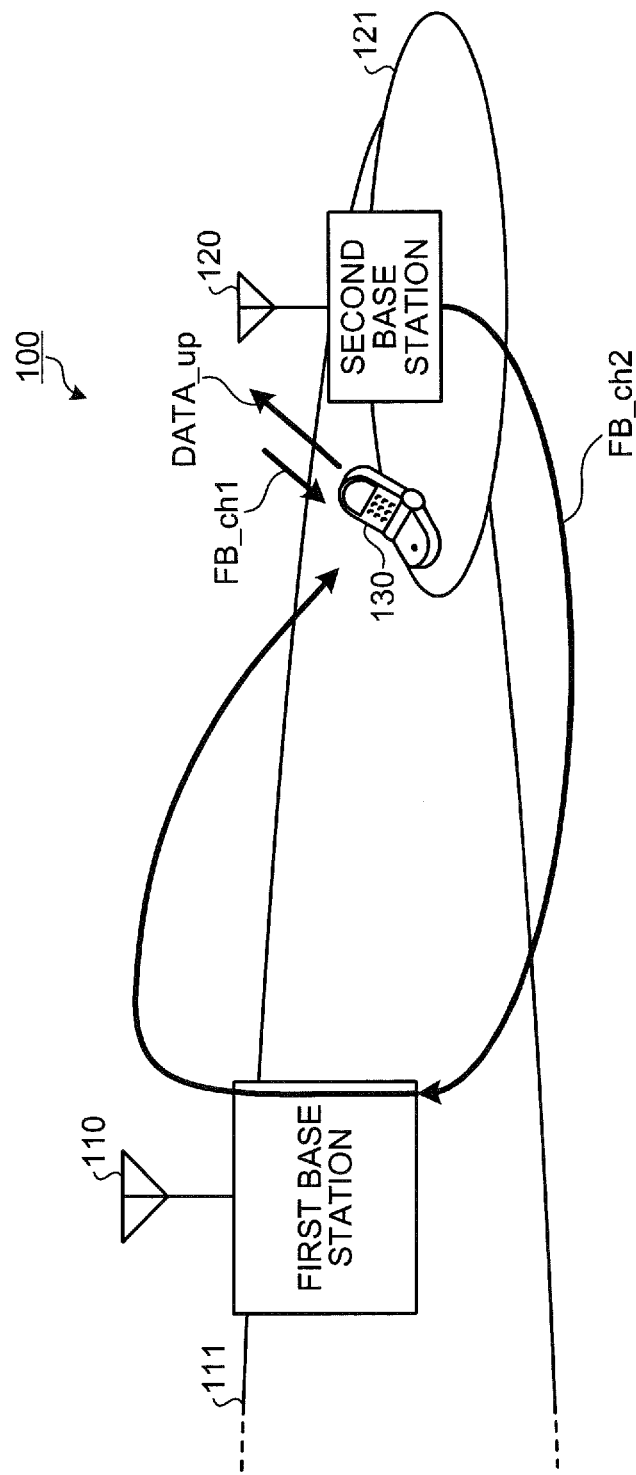
FIG. 12 is a diagram of an example of candidate paths for feedback on uplink data.

FIG. 12 is a diagram of an example of candidate paths for feedback on uplink data. In FIG. 12, elements substantially identical to those depicted in FIG. 1 are denoted by the same reference numerals used in FIG. 1. With reference to FIG. 12, selection of a feedback path for feedback on uplink data DATA_up transmitted from the mobile station 130 to the second base station 120 is described.

For example, the first base station 110 selects a feedback path for feedback on the uplink data DATA_up, from among feedback path candidates including the direct path FB_ch1 and the detour path FB_ch2. The direct path FB_ch1 is a path for direct radio transmission from the second base station 120 to the mobile station 130. The detour path FB_ch2 is a path for inter-station transmission from the second base station 120 to the first base station 110 and radio transmission from the first base station 110 to mobile station 130.

Figure 13:
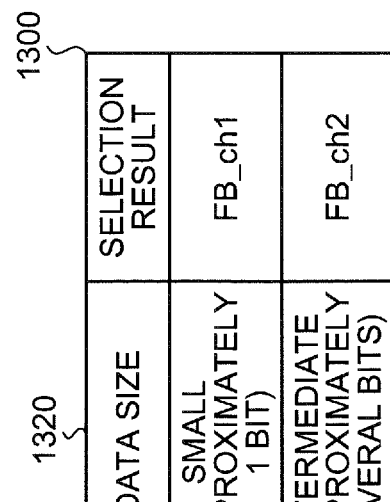
FIG. 13 is a diagram of an example of selection from among the feedback paths of the example of FIG. 12.

FIG. 13 is a diagram of an example of selection from among the feedback paths of the example of FIG. 12. As depicted in a table 1300 of FIG. 13, feedback information concerning the uplink data DATA_up includes Ack/Nack information and UL Grant information. In this case, the first base station 110 (or second base station 120) selects, for example, a feedback path for the Ack/Nack information and a feedback path for the UL Grant information.

As depicted in a column 1310 of the table 1300, a permissible delay for the Ack/Nack information to be transmitted in the direction of "downlink" is relatively small (approximately several ms) and a permissible delay for the UL Grant information to be transmitted in the direction of "downlink" is relatively large (approximately several tens ms). As depicted in a column 1320 of the table 1300, the data size of the Ack/Nack information to be transmitted in the direction of "downlink" is relatively small (approximately 1 bit) and the data size of the UL Grant information to be transmitted in the direction of "downlink" is intermediate (approximately several bits).

An example is described in which the feedback path selection operation of FIG. 8 is adopted. It is assumed that the permissible delay (small) for the Ack/Nack information is equal to or smaller than the threshold while the permissible delay (large) for the UL Grant information exceeds the threshold at step S801 of FIG. 8. In this case, selection of the feedback path for the Ack/Nack information results in the direct path FB_ch1, while selection of the feedback path for the UL Grant information results in the detour path FB_ch2. The selection operation based on the operations at steps S802 and S803 of FIG. 8 may be carried out.

An example is described in which the feedback path selection operation of FIG. 9 is adopted. It is assumed that the permissible delay (small) for the Ack/Nack information is equal to or smaller than the threshold while the permissible delay (large) for the UL Grant information exceeds the threshold at step S901 of FIG. 9. In this case, selection of the feedback path for the Ack/Nack information results in the direct path FB_ch1, while selection of the feedback path for the UL Grant information results in the detour path FB_ch2. The selection operation based on the operations at steps S902 and S903 of FIG. 9 may additionally be carried out.

In this manner, the communication system 100 of the embodiment, in an uplink/downlink asymmetrical connection mode, transmits downlink data via the first base station 110, which has a higher downlink propagation quality than the second base station 120, and transmits feedback information concerning downlink data through a path passing through the second base station 120, which has a higher uplink propagation quality than the first base station 110, enabling downlink data to be transmitted in a state of high transmission quality and improving the propagation quality of feedback information.

Further, the communication system 100, in an uplink/downlink asymmetrical connection mode, transmits uplink data via the second base station 120, which has a higher uplink propagation quality than the first base station 110, and transmits feedback information concerning uplink data through a path passing through the first base station 110, which has a higher downlink propagation quality than the second base station 120, enabling uplink data to be transmitted in a state of high transmission quality and improving the propagation quality of feedback information.

The propagation quality of feedback information can be improved without lowering the encoding rate of an error-correcting encoding method for the feedback information to improve error correction capability and without increasing transmission power for transmitting the feedback information. As a result, the propagation quality of the feedback information can be improved without increasing communication resources and consumption power for feedback information transmission.

As described above, according to the base station, the mobile station, the communication system, and the communication method, in uplink/downlink asymmetrical connection where the optimal base station for uplink is different from the optimal base station for downlink, feedback information concerning data transmitted between one base station and the mobile station can be transmitted through a path passing through another base station. This improves the transmission quality of the feedback information.

The base station, the mobile station, the communication system, and the communication method disclosed herein offer an effect of improving the transmission quality of feedback information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station communicating with a mobile station that receives downlink data from the base station and that transmits uplink data to a second base station, the base station comprising:
   a data transmitter configured to transmit the downlink data to the mobile station;
   a control information receiver configured to receive from the mobile station through a direct path or a path passing through the second base station, feedback information concerning the downlink data transmitted by the data transmitter; and
   a path selector configured to select, as a feedback path, the direct path or the path from the mobile station to the base station via the second base station, wherein the path selector selects the feedback path according to a type of the feedback information and the control information receiver receives the feedback information through the feedback path selected by the path selector,
   wherein the path selector determines an exploitability of the feedback path passing through the second base station,
   determines that the feedback path passing through the second base station is unexploitable, when an inter-station connection with the second base station is impossible, and
   selects the direct path as the feedback path when the feedback path passing through the second base station is unexploitable.

2. The base station according to claim 1, wherein the path selector determines that the path passing through the second base station is unexploitable, when transmission delay in transmission of the feedback information through the path passing through the second base station exceeds a given threshold.

3. The base station according to claim 1, wherein the path selector determines that the path passing through the second base station is unexploitable, when no allocable communication resource is available on the path passing through the second base station.

4. A base station communicating with a mobile station that receives downlink data from the base station and that transmits uplink data to a second base station, the base station comprising:
- a data transmitter configured to transmit the downlink data to the mobile station;
- a control information receiver configured to receive from the mobile station through a direct path or a path passing through the second base station, feedback information concerning the downlink data transmitted by the data transmitter;
- a path selector configured to select, as a feedback path, the direct path or the path from the mobile station to the base station via the second base station;
- a measuring unit configured to measure propagation quality of an uplink from the mobile station to the base station; and
- a receiver configured to receive from the second base station, quality information indicative of propagation quality of an uplink from the mobile station to the second base station, wherein
- the path selector, based on the propagation quality measured by the measuring unit and the quality information received by the receiver, selects the feedback path, and
- the control information receiver receives the feedback information through the selected feedback path, wherein
- the path selector selects the feedback path according to a type of the feedback information,
- wherein the path selector determines an exploitability of the feedback path passing through the second base station,
- determines that the feedback path passing through the second base station is unexploitable, when an inter-station connection with the second base station is impossible, and
- selects the direct path as the feedback path when the feedback path passing through the second base station is unexploitable.

5. The base station according to claim 4, wherein the path selector selects the direct path, when permissible delay for the feedback information is equal to or smaller than a given threshold.

6. The base station according to claim 4, wherein the path selector selects the direct path, when a feedback cycle of the feedback information is equal to or smaller than a given threshold.

7. The base station according to claim 4, wherein the path selector selects the direct path, when data size of the feedback information is equal to or smaller than a given threshold.

8. The base station according to claim 4, wherein the path selector selects the feedback path according to an encoding method for the feedback information.

9. A communication system comprising:
a first base station; and
a mobile station that receives downlink data from the first base station and transmits uplink data to a second base station different from the first base station,
the mobile station comprising:
- a data receiver configured to receive the downlink data from the first base station;
- a data transmitter configured to transmit the uplink data to the second base station;
- a control information transmitter configured to transmit to the first base station through a direct path or a first path passing through the second base station, first feedback information concerning the downlink data received by the data receiver; and
- a control information receiver configured to receive from the second base station through a second path passing through the first base station, second feedback information concerning the uplink data transmitted by the data transmitter; and the first base station comprising:
- a data transmitter configured to transmit the downlink data to the mobile station;
- a control information receiver configured to receive from the mobile station through the direct path or the first path passing through the second base station, the first feedback information concerning the downlink data transmitted by the data transmitter; and
- a path selector configured to select, as a feedback path, the direct path or the path from the mobile station through the first path, wherein
- the control information receiver receives the feedback information through the feedback path selected by the path selector and the path selector selects the feedback path according to a type of the feedback information
- wherein the path selector determines an exploitability of the first path passing through the second base station,
- determines that the first path passing through the second base station is unexploitable, when an inter-station connection with the second base station is impossible, and
- selects the direct path as the feedback path when the first path passing through the second base station is unexploitable.

10. The communication system according to claim 9, the mobile station further comprising a path information receiver configured to receive from any one of the first base station and the second base station, selection information indicative of a result of selection of the feedback path from among feedback paths including the second path passing through the first base station and the first path passing through the second base station, wherein
- the data transmitter of the mobile station transmits the first feedback information through the path indicated by selection information received by the path information receiver, and
- the data receiver of the mobile station receives the second feedback information through the path indicated by the selection information received by the path information receiver.

11. A communication method of a base station communicating with a mobile station that receives downlink data from the base station and that transmits uplink data to a second base station, the communication method comprising:
transmitting the downlink data to the mobile station;
receiving from the mobile station through a path, feedback information concerning the transmitted downlink data; and
selecting, as the path, a direct path or a path from the mobile station to the base station via the second base station, according to a type of the feedback information,
the feedback information is received through the selected path, wherein selecting the path comprises:
determining an exploitability of the path passing through the second base station, determining that the path passing through the second base station is unexploitable, when an inter-station connection with the second base station is impossible, and selecting the direct path as the selected path when the path passing through the second base station is unexploitable.

12. The communication method according to claim 11, wherein the base station communicates with a second mobile station that transmits uplink data to the base station and that receives downlink data from the second base station, the communication method further comprising:

receiving the uplink data from the second mobile station; and transmitting to the second mobile station through a path passing through the second base station, feedback information concerning the received uplink data.

13. The communication method according to claim 11, further comprising:

configuring the base station to receive from the mobile station through the path passing through the second base station, the feedback information concerning the transmitted downlink data.

14. A communication method of a communication system including a mobile station that receives downlink data from a first base station and transmits uplink data to a second base station different from the first base station, the communication method comprising:

the mobile station, receiving the downlink data from the first base station;

transmitting the uplink data to the second base station;

transmitting to the first base station through a first path, first feedback information concerning the received downlink data; and receiving from the second base station through a second path passing through the first base station, second feedback information concerning the transmitted uplink data; and the first base station, transmitting the downlink data to the mobile station;

receiving from the mobile station through the first path, the first feedback information concerning the transmitted downlink data; and selecting, as the first path, a direct path or a path from the mobile station to the first base station via the second base station according to a type of the first feedback information, the first feedback information is received through the selected path, wherein selecting the path comprises:

determining an exploitability of the path passing through the second base station, determining that the path passing through the second base station is unexploitable, when an inter-station connection with the second base station is impossible, and selecting the direct path as the path when the path passing through the second base station is unexploitable.

15. The communication method according to claim 14, further comprising:

configuring the first base station to receive from the mobile station through the first path passing through the second base station, the feedback information concerning the transmitted downlink data.

* * * * *

UNITED STATES PATENT AND TRADEMARK OFFICE
CERTIFICATE OF CORRECTION

PATENT NO. : 8,942,699 B2
APPLICATION NO. : 12/855221
DATED : January 27, 2015
INVENTOR(S) : Otonari It is certified that error appears in the above-identified patent and that said Letters Patent is hereby corrected as shown below:

Title page, item [73]

Assignee to be corrected from "Fujitsu Limited, Kawaski (JP)" to "Fujitsu Limited, Kawasaki (JP)".

Signed and Sealed this
Twenty-eighth Day of April, 2015

Michelle K. Lee
*Director of the United States Patent and Trademark Office*